C. B. WOOD.
PLASTIC COMPOSITION.
APPLICATION FILED JULY 1, 1914.
1,265,855.  Patented May 14, 1918.
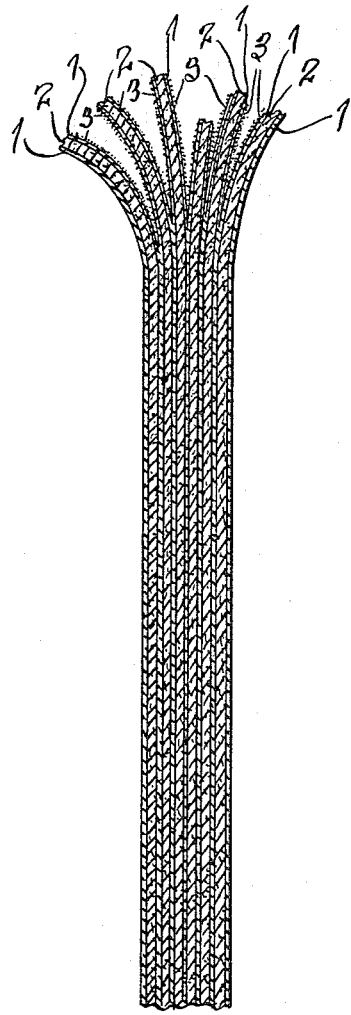
Inventor
C.B. Wood
Witnesses
Chas. H. Trotter.
By
Attorney

UNITED STATES PATENT OFFICE.

CHARLES B. WOOD, OF CHARLESTON, WEST VIRGINIA.

PLASTIC COMPOSITION.

1,265,855.     Specification of Letters Patent.     Patented May 14, 1918.

Application filed July 1, 1914. Serial No. 848,455.

*To all whom it may concern:*

Be it known that I, CHARLES B. WOOD, residing at Charleston, in the county of Kanawha and State of West Virginia, have invented certain new and useful Improvements in Plastic Compositions; and I do hereby declare the following to be a full, clear, and exact description of the invention, such as will enable others skilled in the art to which it appertains to make and use the same.

This invention relates to a composition of matter to be used as a substitute for rubber, and one of the principal objects of the invention is to provide a composition which can be molded into the desired form, which will be resilient, flexible, and durable for many of the purposes for which expensive rubber is used.

Another object of the invention is to produce a rubber substitute for use in making up machine belting, tires, and for many other purposes, as well as for use as a plastic foldable material and as the intermediate layers in belting, tires and other laminated articles.

Another object of the invention is to provide a process of producing various articles from the composition referred to.

The accompanying drawing ilustrates a sectional view taken through a laminated belt or tire material made in accordance with this invention.

In carrying out the invention, a thin paste is made by means of mixing shellac with concentrated alcohol. If the composition is to be used for making laminated belts or tires, the shellac and alcohol paste is applied to the opposite side of twilled cotton of medium weight, and a layer of fine white pine saw-dust is applied to one or both sides of the plaited fabric. Then one side of the fabric is saturated with the shellac paste. The strips or pieces of cotton should be of the size and width desired for the finished article. The number of layers may be varied to give the required thickness. The paste should be applied to both sides of the cloth and when the desired thickness is obtained, the article should be permitted to stand for about twenty-four hours so that the layers will adhere. Then place the laminated fabric in a press and submit the same to a pressure of about one hundred pounds per square inch and permit the article to remain in the press for eighteen hours.

When taken out of the press, the laminated fabric should be placed in an air-tight vat containing formaldehyde in sufficient quantity to thoroughly saturate the laminated fabric and the article should be left in the vat for about six hours. The formaldehyde serves to impart toughness to the composition. Then the laminated fabric or article should be taken from the vat and suspended over the same so that the fumes of the formaldehyde may thoroughly penetrate the laminated fabric and should be left in this condition for about six hours.

For some characters of articles, it will be found advisable to use asbestos in lieu of the saw-dust, and if the composition is to be used for a moldable article without the use of the fabric layers, the composition may be prepared as follows:

Dissolve shellac in concentrated alcohol, to form a thick paste, take asbestos wool and lay on in layers one-half inch thick, then pour on this paste and mix thoroughly together. Repeat this process until amount required has been produced. The pouring of the paste on the fibrous layers produces a thorough and uniform mixing of the ingredients and a uniform distribution of the fibrous material throughout the composition. Then place the composition in a mold which is submitted to a pressure of about fifty pounds per square inch and permit to remain in the press for forty-eight hours. After the article has been removed it is placed in an air-tight vat and saturated with formaldehyde for twenty-four hours, after which it is removed and placed in position where the air can surround the article and assist in drying the same.

The plastic material hereindescribed may be used to advantage for shoe soles and heels, go-cart tires, buggy tires, and many of the uses for which rubber is utilized, especially for light service. The material is much tougher than rubber, is light, the cost is about one-half, and the wearing qualities are greater than rubber for many purposes.

In the accompanying drawing, the numeral 1 designates a layer of shellac applied with a brush upon opposite sides of a strip of fabric 2. Upon the inner side of the shellac layer 1 a quantity of fine white pine saw-dust or asbestos 3 is applied, and each layer of the laminated fabric is provided with the same materials before it is pressed and submitted to the formaldehyde bath.

The following ingredients and proportions have been found to give the best results:

| | |
|---|---|
| Shellac | 3 parts. |
| Concentrated alcohol | 5 parts. |
| Fine white pine saw-dust | 3 parts. |
| Comminuted asbestos | 3 parts. |
| Formaldehyde | 1 part. |

The proportions named may be varied within certain limit.

What is claimed is:

1. A resilient flexible plastic composition adapted to be employed as a substitute for rubber and including shellac, alcohol and fibrous material saturated with formaldehyde in substantially the proportions stated.

2. A flexible resilient plastic composition adapted to be used as a substitute for rubber and including shellac, alcohol and fine white pine sawdust saturated with formaldehyde in substantially the proportions stated.

3. The process of producing a resilient flexible plastic composition adapted to be employed as a substitute for rubber, which consists in dissolving shellac in concentrated alcohol to form a thick paste, arranging fibrous material in layers, pouring the paste on the layers of fibrous material and mixing the ingredients thoroughly together, subjecting the mixture to pressure and finally saturating the pressed material with formaldehyde.

In testimony whereof I affix my signature in presence of two witnesses.

CHARLES B. WOOD.

Witnesses:
G. A. BEALOR,
W. C. SHARPE.